United States Patent
Yan et al.

(10) Patent No.: US 9,577,803 B2
(45) Date of Patent: Feb. 21, 2017

(54) ACK/NAK BIT BUNDLING IN CARRIER AGGREGATION SCENARIOS

(75) Inventors: Yu Yu Yan, Beijing (CN); Chun Hai Yao, Beijing (CN); Peter Skov, Beijing (CN); Li Zhang, Beijing (CN)

(73) Assignee: Nokia Solutions and Networks OY, Espoo (FI)

(*) Notice: Subject to any disclaimer, the term of this patent is extended or adjusted under 35 U.S.C. 154(b) by 0 days.

(21) Appl. No.: 14/400,339

(22) PCT Filed: May 11, 2012

(86) PCT No.: PCT/CN2012/075394
§ 371 (c)(1),
(2), (4) Date: Nov. 11, 2014

(87) PCT Pub. No.: WO2013/166723
PCT Pub. Date: Nov. 14, 2013

(65) Prior Publication Data
US 2015/0124727 A1    May 7, 2015

(51) Int. Cl.
*H04L 1/00*    (2006.01)
*H04L 5/00*    (2006.01)
*H04L 1/16*    (2006.01)

(52) U.S. Cl.
CPC .......... *H04L 5/0046* (2013.01); *H04L 1/1635* (2013.01); *H04L 5/001* (2013.01); *H04L 5/0055* (2013.01)

(58) Field of Classification Search
CPC ...... H04W 80/04; H04W 80/05; H04W 80/06; H04W 80/07; H04W 80/08; H04W 72/04; H04W 72/05; H04W 72/06
(Continued)

(56) References Cited

U.S. PATENT DOCUMENTS

2009/0213769 A1* 8/2009 Shen ............... H04W 72/14
                                                        370/280
2009/0249153 A1* 10/2009 Zhang ................ H04L 1/1887
                                                        714/748
(Continued)

FOREIGN PATENT DOCUMENTS

CN    101986591 A    3/2011
CN    102098145 A    6/2011
(Continued)

OTHER PUBLICATIONS

International Search Report for International Application No. PCT/CN2012/075394, mailed Feb. 7, 2013, 3 pages.
(Continued)

*Primary Examiner* — Dady Chery
(74) *Attorney, Agent, or Firm* — Brake Hughes Bellermann LLP

(57) ABSTRACT

Techniques are disclosed for ACK/NAK bit bundling in carrier aggregation scenarios. Such measures exemplarily comprise generating a set of acknowledgement bits confirming receipt of payload data of a radio frame in a carrier aggregation mode aggregating a primary and at least one secondary carrier, said radio frame being divided into a plurality of downlink subframes and uplink subframes, each of said downlink subframes comprising at least one codeword per carrier, each of said acknowledgement bits is allocated to one of said codewords of one of said downlink subframes, and applying spatial domain bundling and/or time domain bundling on said set of acknowledgement bits distinctive for each of said primary and said at least one secondary carrier, wherein said spatial domain bundling is an AND operation of all acknowledgement bits allocated to each codeword of one carrier of said primary and said at least one secondary carrier and one downlink subframe.

15 Claims, 6 Drawing Sheets

(58) Field of Classification Search
USPC ....... 370/328, 329, 330, 332, 336, 437, 469,
370/473, 524; 455/450, 452.1, 452.2;
709/227
See application file for complete search history.

(56) References Cited

U.S. PATENT DOCUMENTS

2012/0099491 A1   4/2012   Lee et al.
2013/0176920 A1   7/2013   Seo et al.

FOREIGN PATENT DOCUMENTS

| CN | 102104461 A | 6/2011 |
| EP | 2451111 A2 | 11/2011 |
| WO | 2012/036514 A1 | 3/2012 |
| WO | 2012036514 A1 | 3/2012 |
| WO | 2012/061257 A1 | 5/2012 |

OTHER PUBLICATIONS

Extended European Search Report for European Application No. 128762275, mailed Nov. 26, 2015, 8 pages.
First Office Action with English translation for Chinese Application 201280074165.2, mailed on Dec. 9, 2016, 11 pages.

\* cited by examiner

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 5 | 10 ms | D | S | U | D | D | D | D | D | D | D |

Figure 6

ACK/NAK BIT BUNDLING IN CARRIER AGGREGATION SCENARIOS

This application is a national stage entry of PCT Application No. PCT/CN2012/075394, filed on May 11, 2012, entitled "ACK/NAK BIT BUNDLING IN CARRIER AGGREGATION SCENARIOS", which is hereby incorporated by reference in its entirety.

FIELD

The present invention relates to acknowledgement/negative acknowledgement (ACK/NAK, A/N) bit bundling in carrier aggregation scenarios. More specifically, the present invention exemplarily relates to measures (including methods, apparatuses and computer program products) for realizing ACK/NAK bit bundling in carrier aggregation scenarios.

BACKGROUND

The present specification generally relates to feedback control of downlink connections in carrier aggregation scenarios, especially in scenarios where time division duplex (TDD) is deployed.

In Long Term Evolution (LTE) Rel-10, the physical uplink control channel (PUCCH) format 3 only supports up to 20 ACK/NAK bits per feedback transmission. Hence, PUCCH format 3 can only support ACK/NAK feedback for TDD configuration 5 with up to two component carriers (CC), since in case of more CCs, more than 20 ACK/NAK bits would arise. In case of two CCs, a maximum number of ACK/NAK bits of 36 may arise. Hence, in case of two CCs (if the total number of ACK/NAK bits exceeds 20), spatial bundling is applied. At that, spatial (domain) bundling means that if two (more than one) codewords are transmitted per subframe, the ACK/NAK bits corresponding to each of the codewords are combined via an AND operation and the resulting bit is the spatial bundled ACK/NACK bit. In LTE Rel-10 in relation to PUCCH format 3 for TDD configuration 5, no time or carrier domain bundling is supported.

In LTE Rel-11, a user equipment (UE) configured with TDD configuration 5 and more than 2 CCs will be required to provide downlink (DL) peak data rates. In recent RAN1 meetings, the necessity of support of the ACK/NAK feedback in this case is raised and different bundling schemes to support the ACK/NAK feedback are discussed.

The following table illustrates the maximum number of ACK/NAK bits that may arise in the case of TDD configuration 5. It is to be noted that according to TDD configuration 5, a ratio of uplink (UL) subframes to DL subframes is set to 9:1. In particular, subframe 0 is set to DL, subframe 1 is set to DL/special subframe (guard periods), subframe 2 is set to UL, and subframes 3 to 9 are set to DL. As is derivable from the following table, in case of TDD configuration 5 and 5 CCs, the maximum number of ACK/NAK bits that may arise is 45 after spatial domain bundling.

|  | The number of CCs | | | |
| --- | --- | --- | --- | --- |
|  | 2 CCs | 3 CCs | 4 CCs | 5 CCs |
| Maximum number of A/N bits without bundling | 36 | 54 | 72 | 90 |
| Maximum number of A/N bits with spatial domain bundling | 18 | 27 | 36 | 45 |

Hence, the problem arises that in a deployment with more than 2 CCs which uses TDD configuration 5, the required ACK/NAK bits, even if spatial bundling is applied, exceed 20, which is the maximum number of ACK/NAK bits that PUCCH format 3 can carry.

Hence, there is a need to provide for ACK/NAK bit bundling in carrier aggregation scenarios.

SUMMARY

Various exemplary embodiments of the present invention aim at addressing at least part of the above issues and/or problems and drawbacks.

Various aspects of exemplary embodiments of the present invention are set out in the appended claims.

According to an exemplary aspect of the present invention, there is provided a method comprising generating a set of acknowledgement bits confirming receipt of payload data of a radio frame in a carrier aggregation mode aggregating a primary and at least one secondary carrier, said radio frame being divided into a plurality of downlink subframes and uplink subframes, each of said downlink subframes comprising at least one codeword per carrier, each of said acknowledgement bits is allocated to one of said codewords of one of said downlink subframes, and applying spatial domain bundling and/or time domain bundling on said set of acknowledgement bits distinctive for each of said primary and said at least one secondary carrier, wherein said spatial domain bundling is an AND operation of all acknowledgement bits allocated to each codeword of one carrier of said primary and said at least one secondary carrier and one downlink subframe of said plurality of downlink subframes of said radio frame and said time domain bundling is an AND operation of all acknowledgement bits associated with corresponding downlink subframes of said radio frame.

According to an exemplary aspect of the present invention, there is provided a method comprising receiving an acknowledgement compilation, said compilation being a result of application, distinctive for each of a primary and at least one secondary carrier, of spatial domain bundling and/or time domain bundling on a set of acknowledgement bits confirming receipt of payload data of a radio frame in a carrier aggregation mode aggregating said primary and said at least one secondary carrier, said radio frame being divided into a plurality of downlink subframes and uplink subframes, each of said downlink subframes comprising at least one codeword per carrier, each of said acknowledgement bits being allocated to one of said codewords of one of said downlink subframes, and deriving success information of a transmission corresponding to said radio frame from said acknowledgement compilation based on said distinction for each of said primary and said at least one secondary carrier.

According to an exemplary aspect of the present invention, there is provided an apparatus comprising a generation module configured to generate a set of acknowledgement bits confirming receipt of payload data of a radio frame in a carrier aggregation mode aggregating a primary and at least one secondary carrier, said radio frame being divided into a plurality of downlink subframes and uplink subframes, each of said downlink subframes comprising at least one codeword per carrier, each of said acknowledgement bits is allocated to one of said codewords of one of said downlink subframes, and a bundling module configured to apply spatial domain bundling and/or time domain bundling on said set of acknowledgement bits distinctive for each of said primary and said at least one secondary carrier, wherein said spatial domain bundling is an AND operation of all acknowledgement bits allocated to each codeword of one carrier of said primary and said at least one secondary carrier and one downlink subframe of said plurality of downlink subframes of said radio frame, and said time domain bundling is an AND operation of all acknowledgement bits associated with corresponding downlink subframes of said radio frame.

According to an exemplary aspect of the present invention, there is provided an apparatus comprising a connection controller configured to receive an acknowledgement compilation, said compilation being a result of application, distinctive for each of a primary and at least one secondary carrier, of spatial domain bundling and/or time domain bundling on a set of acknowledgement bits confirming receipt of payload data of a radio frame in a carrier aggregation mode aggregating said primary and said at least one secondary carrier, said radio frame being divided into a plurality of downlink subframes and uplink subframes, each of said downlink subframes comprising at least one codeword per carrier, each of said acknowledgement bits being allocated to one of said codewords of one of said downlink subframes, and a deriving module configured to derive success information of a transmission corresponding to said radio frame from said acknowledgement compilation based on said distinction for each of said primary and said at least one secondary carrier.

According to an exemplary aspect of the present invention, there is provided a computer program product comprising computer-executable computer program code which, when the program is run on a computer (e.g. a computer of an apparatus according to the aforementioned apparatus-related exemplary aspect of the present invention), is configured to cause the computer to carry out the method according to the aforementioned method-related exemplary aspect of the present invention.

Such computer program product may comprise a computer-readable medium on which the computer-executable computer program code is stored, and/or wherein the program is directly loadable into an internal memory of the processor.

Any one of the above aspects enables an efficient ACK/NAK feedback also in case of TDD configuration 5 and with up to 5 CCs. At that, a trade-off between DL throughput and UL control coverage can be handled.

By way of exemplary embodiments of the present invention, there is provided ACK/NAK bit bundling in carrier aggregation scenarios. More specifically, by way of exemplary embodiments of the present invention, there are provided measures and mechanisms for realizing ACK/NAK bit bundling in carrier aggregation scenarios.

Thus, improvement is achieved by methods, apparatuses and computer program products enabling/realizing ACK/NAK bit bundling in carrier aggregation scenarios.

BRIEF DESCRIPTION OF THE DRAWINGS

In the following, the present invention will be described in greater detail by way of non-limiting examples with reference to the accompanying drawings, in which FIG. 6 is a schematic diagram illustrating selection rules according to exemplary embodiments of the present invention.

DETAILED DESCRIPTION OF DRAWINGS AND EMBODIMENTS OF THE PRESENT INVENTION

Figure 1:
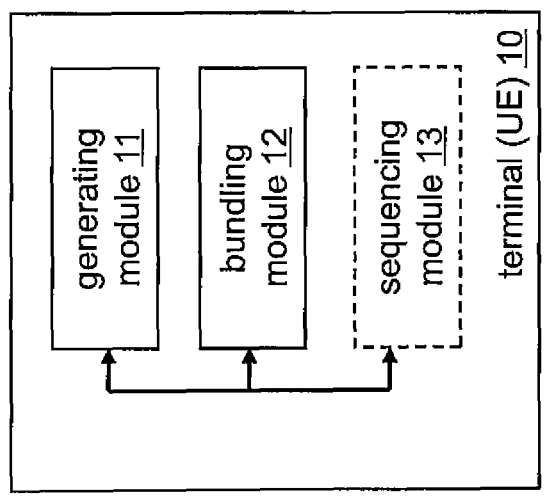
FIG. 1 is a block diagram illustrating an apparatus according to exemplary embodiments of the present invention.

The present invention is described herein with reference to particular non-limiting examples and to what are presently considered to be conceivable embodiments of the present invention. A person skilled in the art will appreciate that the invention is by no means limited to these examples, and may be more broadly applied.

It is to be noted that the following description of the present invention and its embodiments mainly refers to specifications being used as non-limiting examples for certain exemplary network configurations and deployments. Namely, the present invention and its embodiments are mainly described in relation to Third Generation Partnership Project (3GPP) specifications being used as non-limiting examples for certain exemplary network configurations and deployments. In particular, ACK/NAK feedback in relation to carrier aggregation scenarios of LTE systems is used as a non-limiting example for the applicability of thus described exemplary embodiments. As such, the description of exemplary embodiments given herein specifically refers to terminology which is directly related thereto. Such terminology is only used in the context of the presented non-limiting examples, and does naturally not limit the invention in any way. Rather, any other communication or communication related system deployment, etc. may also be utilized as long as compliant with the features described herein.

In particular, the present invention and its embodiments may be applicable any carrier based network compound in which ACK/NAK feedback control information is generated based on the success of receiving of payload data and is transmitted for communication control.

Hereinafter, various embodiments and implementations of the present invention and its aspects or embodiments are described using several variants and/or alternatives. It is generally noted that, according to certain needs and constraints, all of the described variants and/or alternatives may be provided alone or in any conceivable combination (also including combinations of individual features of the various variants and/or alternatives).

According to exemplary embodiments of the present invention, in general terms, there are provided measures and mechanisms for (enabling/realizing) ACK/NAK bit bundling in carrier aggregation scenarios.

In general, time domain bundling is performing the logical AND operation on ACK/NAK bits of sequential subframes. Time domain bundling can be employed to (further) compress the number of ACK/NAK bits, so that the total number of output bits after bundling is no more than 20. ACK/NAK bundling should essentially be designed to handle the trade-off between DL throughput and UL control coverage. For example, with larger payload size, the level of compression of ACK/NAK bits can be reduced, which is beneficial for DL throughput. However, in this case the coding rate becomes higher, thus losing the protection of channel coding, which is not good for UL control coverage.

There are two important aspects in the design of ACK/NAK bundling. The first one is how to form the bundles, i.e.

which ACK/NAK bits should be bundled together. The second one is how to perform the bundling within the bundle. The second one may be solved by re-using LTE Rel-10 time domain bundling method. However, solutions for the first one are proposed according to exemplary embodiments of the present invention.

As already stated, a possible way to implement time domain bundling in the present case (to be applied for more than 2 CCs) is to reuse the time domain bundling method of LTE Rel-10, according to which a number of ACK/NAK bits according to the number of continuous DL subframes (i.e. DL subframes not separated by UL subframes) are fed back. According to such implementation, the available number of bits for each component carrier is after spatial and time domain bundling. The drawback of such implementation is that using 2 bits indicating the retransmissions for 9 DL subframes and for all configured serving cells will cause unnecessary retransmissions and decrease the DL throughput largely.

2 bits (M-to-2 bundling) should be the minimum number of output bits per bundle due to the "last-PDCCH-missing" issue, and LTE Rel-10 time domain bundling can be seen as extendable to any arbitrary number of input ACK/NAK bits. In view of the above, according to exemplary embodiments of the present invention, ACK/NAK bundling is optimized for the above mentioned scenarios.

According to exemplary embodiments of the present invention, a carrier-specific spatial and/or time domain bundling is performed. At that, for each carrier the time domain bundle can be formed in a flexible manner. Specifically, the output bits after bundling can be generated in a different way on each of the involved carriers. That is, whether spatial or time domain bundling is used, and if used, how many time domain bundles are created, may depend on the considered carrier. Hence, according to exemplary embodiments of the present invention, for each carrier different numbers of the time domain bundles can be formed. Further, according to exemplary embodiments of the present invention, for each carrier can be decided separately which ACK/NAK bits are bundled together.

According to exemplary embodiments of the present invention, carrier-specific spatial domain bundling may be performed. That is, it can be independently configured for each carrier to perform spatial domain bundling or not, in contrast to current solution that configuration of spatial domain bundling is applied to all involved carriers.

FIG. 1 is a block diagram illustrating an apparatus according to exemplary embodiments of the present invention.

As shown in FIG. 1, according to exemplary embodiments of the present invention, the apparatus is a terminal 10 comprising a generating module 11 and a bundling module 12. The generating module 11 generates a set of acknowledgement bits confirming receipt of payload data of a radio frame in a carrier aggregation mode aggregating a primary and at least one secondary carrier. At that, said radio frame is divided into a plurality of downlink subframes and uplink subframes, wherein each of said downlink subframes comprises at least one codeword per carrier. Further, each of the acknowledgement bits is allocated to one of the codewords of one of said downlink subframes. The bundling module 12 applies spatial domain bundling and/or time domain bundling on the set of acknowledgement bits distinctive for each of said primary and said at least one secondary carrier.

At that, spatial domain bundling is an AND operation of all acknowledgement bits allocated to each codeword of one (momentarily considered) carrier of said primary and said at least one secondary carrier and one downlink subframe of said plurality of downlink subframes of said radio frame. Further, time domain bundling is an AND operation of all acknowledgement bits associated with corresponding downlink subframes of the radio frame.

According to further embodiments of the present invention, the bundling module 12 performs, for the primary carrier, said spatial domain bundling for each downlink subframe of said plurality of downlink subframes of said radio frame. Further, the bundling module 12 performs, for each of said at least one secondary carrier, said spatial domain bundling for each downlink subframe of said plurality of downlink subframes of said radio frame. In addition, the bundling module performs, for each of said at least one secondary carrier, said time domain bundling for each spatial domain bundled acknowledgement bit associated with corresponding downlink subframes of said radio frame.

In other words, different bundling procedure is applied for the primary cell (PCell, corresponding to the primary carrier) and the secondary cell (SCell, corresponding to the at least one secondary carriers). According to exemplary embodiments of the present invention, PCell supports only spatial domain bundling. Further, SCell supports both spatial and time domain bundling.

Consequently, if for PCell only spatial bundling is supported, the maximum number of ACK/NAK bits (acknowledgement bits) is 9 (possible more than one codeword per subframe are spatially bundled). Such relatively high number of ACK/NAK bits for PCell is aimed for in order to avoid DL throughput loss for PCell. On the other hand, for SCell, time domain bundling is applied on top of spatial domain bundling for each (secondary) component carrier. As a consequence, the maximum number of ACK/NAK bits for each (secondary) component carrier is 2 after applying of spatial and time domain bundling.

The following table illustrates the maximum number of ACK/NAK bits which may arise for TDD configuration 5 according to above described exemplary embodiments of the present invention as compared to the situation without exemplary embodiments of the present invention.

| | | The number of CCs | | | |
|---|---|---|---|---|---|
| | | 2 CCs | 3 CCs | 4 CCs | 5 CCs |
| — | Maximum number of A/N bits without bundling | 36 | 54 | 72 | 90 |
| — | Maximum number of A/N bits with spatial domain bundling | 18 | 27 | 36 | 45 |
| according to exemplary embodiments of the present invention | Maximum number of A/N bits with spatial domain bundling (PCell and SCell) and time domain bundling (SCell only) | Sum: 11 PCell: 9 SCell: 2 | Sum: 13 PCell: 9 SCell: 4 | Sum: 15 PCell: 9 SCell: 6 | Sum: 17 PCell: 9 SCell: 8 |

According to still further embodiments of the present invention, the bundling module 12 performs, for each of said primary and said at least one secondary carrier, said spatial domain bundling for each downlink subframe of said plurality of downlink subframes of said radio frame. Further, the bundling module 12 splits said plurality of downlink subframes into at least two groups. In addition, the bundling module 12 performs, for each of said primary and said at least one secondary carrier, said time domain bundling for each spatial domain bundled acknowledgement bit associated with corresponding downlink subframes for each of said at least two groups of said radio frame.

Preferably, according to exemplary embodiments of the present invention, the bundling module selects the first downlink subframe of every two downlink subframes of said plurality of downlink subframes of said radio frame to form a first group. Further, the bundling module 12 selects the second downlink subframe of every two downlink subframes of said plurality of downlink subframes of said radio frame to form a second group. That is, preferably, the plurality of DL subframes are split into two groups by applying the above stated selection rules, and performs the time domain bundling on each of the two groups.

The selection rules are further illustrated in connection with FIG. 6. At that, "D" means DL subframe, "U" means UL subframe and "S" means DL/special subframe (guard periods). Same pattern means the same group. At that, the checkered elements stand for group 1, whereas the dotted elements stand for group 2.

The 9 DL subframes of each component carrier are divided into two groups. The groups are formed by selecting the first subframe from every two subframes for the first group, and by selecting the second subframe from every two subframes for the second group. As is derivable from FIG. 6, the first group contains the subframes number 0, 3, 5, 7 and 9. Further, the second group contains the subframes number 1, 4, 6 and 8.

Subsequently, time domain bundling is applied within each group, and 2 bits are used for ACK/NCK feedback within each group. Consequently, maximum of 4 ACK/NAK bits is needed for each component carrier, and a total maximum of 20 bits is needed in the case of 5 CCs.

The following table illustrates the maximum number of ACK/NAK bits which may arise for TDD configuration 5 according to above described exemplary embodiments of the present invention as compared to the situation without exemplary embodiments of the present invention.

| | | The number of CCs | | | |
|---|---|---|---|---|---|
| | | 2 CCs | 3 CCs | 4 CCs | 5 CCs |
| — | Maximum number of A/N bits without bundling | 36 | 54 | 72 | 90 |
| — | Maximum number of A/N bits with spatial domain bundling | 18 | 27 | 36 | 45 |
| according to exemplary embodiments of the present invention | Maximum number of A/N bits with spatial domain bundling and time domain bundling (after grouping) | 8 | 12 | 16 | 20 |

It is to be noted that, according to exemplary embodiments of the present invention, the time domain compression is applied to only 4 or 5 subframes (dependent on the group), so that the unnecessary re-transmissions are successfully reduced. Further, considering that not all subframes are scheduled within one TDD frame, the introduced mechanism of group division according to exemplary embodiments of the present invention also provides a good balance of scheduled subframes between each group.

According to still further embodiments of the present invention, the terminal 10 may further comprise a sequencing module 13. The sequencing module 13 sequences each of said bundled acknowledgement bits in order of the corresponding downlink subframes of said plurality of downlink subframes of said radio frame to form an acknowledgement compilation. Consequently, an acknowledgement compilation of the generated and subsequently bundled acknowledgement bits can be provided in the order of the respective subframes.

It is to be noted, that the apparatus is preferably operable as or at a terminal, user equipment, mobile station or modem, and/or that the apparatus is preferably operable in at least one of a LTE and a LTE-A cellular system.

Figure 2:
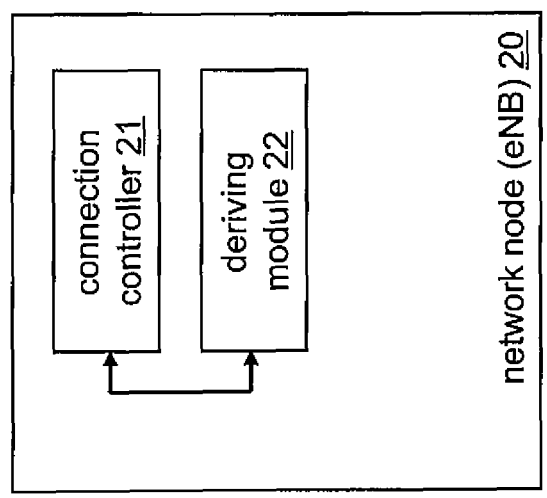
FIG. 2 is a block diagram illustrating an apparatus according to exemplary embodiments of the present invention.

FIG. 2 is a block diagram illustrating an apparatus according to exemplary embodiments of the present invention.

As shown in FIG. 1, according to exemplary embodiments of the present invention, the apparatus is a network node (i.e. evolved NodeB, eNB) 20 comprising a connection controller 21 and a deriving module 22. The connection controller 21 receives an acknowledgement compilation. At that, the compilation is a result of application, distinctive for each of a primary and at least one secondary carrier, of spatial domain bundling and/or time domain bundling on a set of acknowledgement bits confirming receipt of payload data of a radio frame in a carrier aggregation mode aggregating said primary and said at least one secondary carrier. Further, the radio frame is divided into a plurality of downlink subframes and uplink subframes, wherein each of the downlink subframes comprises at least one codeword per carrier. In addition, each of the acknowledgement bits is allocated to one of said codewords of one of said downlink subframes.

The deriving module 22 derives success information of a transmission corresponding to the radio frame from the acknowledgement compilation based on the distinction for each of the primary and said at least one secondary carrier.

That is, the apparatus 20 is able to allocate each of the elements of the acknowledgement compilation to a transmitted subframe or a group of transmitted subframes and/or contents of such transmitted subframes. Subsequently, the apparatus 20 may be able to re-transmit contents of subframes that are indicated to be failed by the acknowledgement bits compressed in the acknowledgement compilation.

It is to be noted, that the apparatus is preferably operable as as or at a base station or access node of a cellular system, and/or that the apparatus is preferably operable in at least one of a LTE and a LTE-A cellular system.

Figure 3:
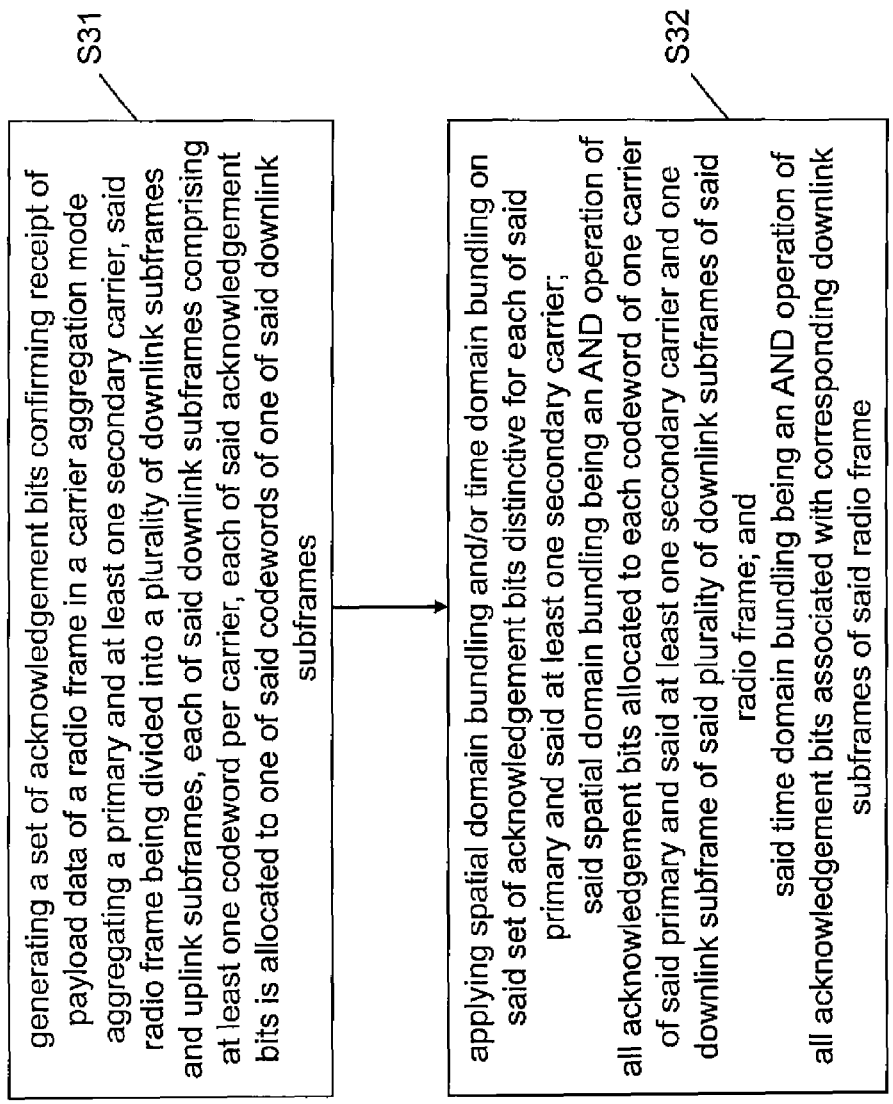
FIG. 3 is a schematic diagram of a procedure according to exemplary embodiments of the present invention.

FIG. 3 is a schematic diagram of a procedure according to exemplary embodiments of the present invention.

As shown in FIG. 3, a procedure according to exemplary embodiments of the present invention comprises an operation of generating a set of acknowledgement bits confirming receipt of payload data of a radio frame in a carrier aggregation mode aggregating a primary and at least one secondary carrier, said radio frame being divided into a plurality of downlink subframes and uplink subframes, each of said downlink subframes comprising at least one codeword per carrier, each of said acknowledgement bits is allocated to one of said codewords of one of said downlink subframes, and an operation of applying spatial domain bundling and/or time domain bundling on said set of acknowledgement bits distinctive for each of said primary and said at least one secondary carrier.

At that, the spatial domain bundling is an AND operation of all acknowledgement bits allocated to each codeword of one carrier of said primary and said at least one secondary carrier and one downlink subframe of said plurality of downlink subframes of said radio frame. Further, the time domain bundling is an AND operation of all acknowledgement bits associated with corresponding downlink subframes of said radio frame.

According to a variation of the procedure shown in FIG. 3, exemplary details of the applying operation are given, which are inherently independent from each other as such.

Such exemplary applying operation according to exemplary embodiments of the present invention may comprise an operation of performing, for said primary carrier, said spatial domain bundling for each downlink subframe of said plurality of downlink subframes of said radio frame, an operation of performing, for each of said at least one secondary carrier, said spatial domain bundling for each downlink subframe of said plurality of downlink subframes of said radio frame, and an operation of performing, for each of said at least one secondary carrier, said time domain bundling for each spatial domain bundled acknowledgement bit associated with corresponding downlink subframes of said radio frame.

According to a further variation of the procedure shown in FIG. 3, exemplary details of the applying operation are given, which are inherently independent from each other as such.

Such exemplary applying operation according to exemplary embodiments of the present invention may comprise an operation of performing, for each of said primary and said at least one secondary carrier, said spatial domain bundling for each downlink subframe of said plurality of downlink subframes of said radio frame, an operation of splitting said plurality of downlink subframes into at least two groups, and an operation of performing, for each of said primary and said at least one secondary carrier, said time domain bundling for each spatial domain bundled acknowledgement bit associated with corresponding downlink subframes for each of said at least two groups of said radio frame.

According to a still further variation of the procedure shown in FIG. 3, exemplary details of the splitting operation are given, which are inherently independent from each other as such.

Such exemplary splitting operation according to exemplary embodiments of the present invention may comprise an operation of selecting the first downlink subframe of every two downlink subframes of said plurality of downlink subframes of said radio frame to form a first group, and an operation of selecting the second downlink subframe of every two downlink subframes of said plurality of downlink subframes of said radio frame to form a second group.

According to a variation of the procedure shown in FIG. 3, exemplary additional operations and are given, which are inherently independent from each other as such. According to such variation, an exemplary method according to exemplary embodiments of the present invention may comprise an operation of sequencing each of said bundled acknowledgement bits in order of the corresponding downlink subframes of said plurality of downlink subframes of said radio frame to form an acknowledgement compilation.

Figure 4:
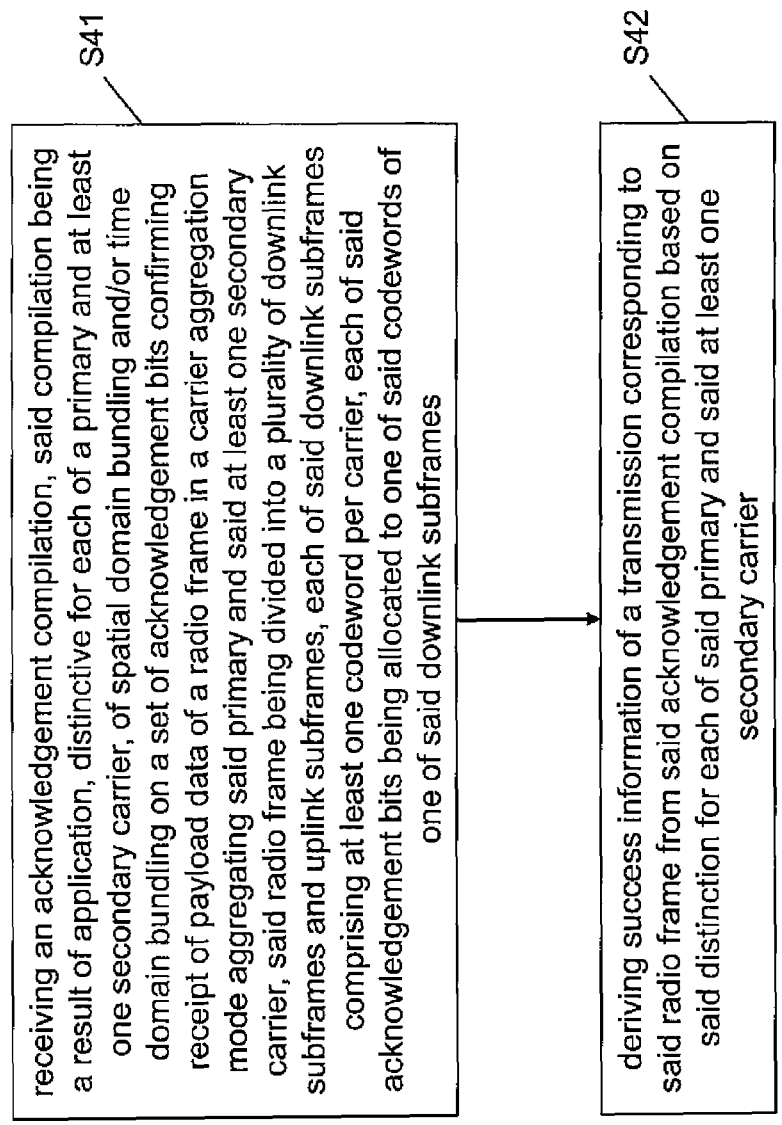
FIG. 4 is a schematic diagram of a procedure according to exemplary embodiments of the present invention.

FIG. 4 is a schematic diagram of a procedure according to exemplary embodiments of the present invention.

As shown in FIG. 4, a procedure according to exemplary embodiments of the present invention comprises an operation of receiving an acknowledgement compilation, said compilation being a result of application, distinctive for each of a primary and at least one secondary carrier, of spatial domain bundling and/or time domain bundling on a set of acknowledgement bits confirming receipt of payload data of a radio frame in a carrier aggregation mode aggregating said primary and said at least one secondary carrier, said radio frame being divided into a plurality of downlink subframes and uplink subframes, each of said downlink subframes comprising at least one codeword per carrier, each of said acknowledgement bits being allocated to one of said codewords of one of said downlink subframes, and an operation of deriving success information of a transmission corresponding to said radio frame from said acknowledgement compilation based on said distinction for each of said primary and said at least one secondary carrier.

The above-described procedures and functions may be implemented by respective functional elements, processors, or the like, as described below.

In the foregoing exemplary description of the network entities, only the units that are relevant for understanding the principles of the invention have been described using functional blocks. The network entity may comprise further units that are necessary for its respective operation. However, a description of these units is omitted in this specification. The arrangement of the functional blocks of the devices is not construed to limit the invention, and the functions may be performed by one block or further split into sub-blocks.

When in the foregoing description it is stated that the apparatus, i.e. network entity (or some other means) is configured to perform some function, this is to be construed to be equivalent to a description stating that a (i.e. at least one) processor or corresponding circuitry, potentially in cooperation with computer program code stored in the memory of the respective apparatus, is configured to cause the apparatus to perform at least the thus mentioned function. Also, such function is to be construed to be equivalently implementable by specifically configured circuitry or means for performing the respective function (i.e. the expression "unit configured to" is construed to be equivalent to an expression such as "means for").

Figure 5:
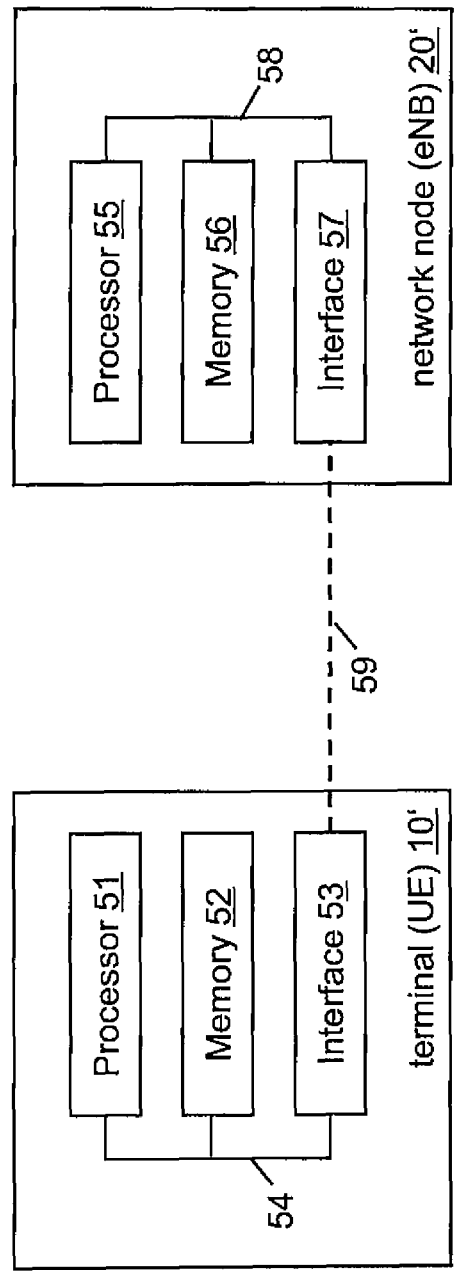
FIG. 5 is a block diagram alternatively illustrating apparatuses according to exemplary embodiments of the present invention.

In FIG. 5, an alternative illustration of apparatuses according to exemplary embodiments of the present invention is depicted. As indicated in FIG. 5, according to exemplary embodiments of the present invention, the device 10' (corresponding to the terminal 10) comprises a processor 51, a memory 52 and an interface 53, which are connected by a bus 54 or the like. Further, according to exemplary embodiments of the present invention, the device 20 (corresponding to the network node 20) comprises a processor 55, a memory 56 and an interface 57, which are connected by a bus 58 or the like, and the apparatuses may be connected via link 59, respectively.

The processor 51/55 and/or the interface 53/57 may also include a modem or the like to facilitate communication over a (hardwire or wireless) link 59, respectively. The interface 53/57 may include a suitable transceiver coupled to one or more antennas or communication means for (hardwire or wireless) communications with the linked or connected device(s), respectively. The interface 53/57 is generally configured to communicate with at least one other apparatus, i.e. the interface thereof.

The memory 52/56 may store respective programs assumed to include program instructions or computer program code that, when executed by the respective processor 51/55, enables the respective electronic device or apparatus to operate in accordance with the exemplary embodiments of the present invention.

In general terms, the respective devices/apparatuses (and/or parts thereof) may represent means for performing respective operations and/or exhibiting respective functionalities, and/or the respective devices (and/or parts thereof) may have functions for performing respective operations and/or exhibiting respective functionalities.

When in the subsequent description it is stated that the processor (or some other means) is configured to perform some function, this is to be construed to be equivalent to a description stating that at least one processor, potentially in cooperation with computer program code stored in the memory of the respective apparatus, is configured to cause the apparatus to perform at least the thus mentioned function. Also, such function is to be construed to be equivalently implementable by specifically configured means for performing the respective function (i.e. the expression "processor configured to [cause the apparatus to] perform xxx-ing" is construed to be equivalent to an expression such as "means for xxx-ing").

According to exemplary embodiments of the present invention, an apparatus 10' representing the terminal 10 comprises at least one processor 51, at least one memory 52 including computer program code, and at least one interface 53 configured for communication with at least another apparatus. The processor (i.e. the at least one processor 51, with the at least one memory 52 and the computer program code) is configured to perform generating a set of acknowledgement bits confirming receipt of payload data of a radio frame in a carrier aggregation mode aggregating a primary and at least one secondary carrier, said radio frame being divided into a plurality of downlink subframes and uplink subframes, each of said downlink subframes comprising at least one codeword per carrier, each of said acknowledgement bits is allocated to one of said codewords of one of said downlink subframes (thus the apparatus comprising corresponding means for generating), and to perform applying spatial domain bundling and/or time domain bundling on said set of acknowledgement bits distinctive for each of said primary and said at least one secondary carrier (thus the apparatus comprising corresponding means for applying).

According to exemplary embodiments of the present invention, an apparatus 20' representing the network node 20 comprises at least one processor 55, at least one memory 56 including computer program code, and at least one interface 57 configured for communication with at least another apparatus. The processor (i.e. the at least one processor 55, with the at least one memory 56 and the computer program code) is configured to perform receiving an acknowledgement compilation, said compilation being a result of application, distinctive for each of a primary and at least one secondary carrier, of spatial domain bundling and/or time domain bundling on a set of acknowledgement bits confirming receipt of payload data of a radio frame in a carrier aggregation mode aggregating said primary and said at least one secondary carrier, said radio frame being divided into a plurality of downlink subframes and uplink subframes, each of said downlink subframes comprising at least one codeword per carrier, each of said acknowledgement bits being allocated to one of said codewords of one of said downlink subframes (thus the apparatus comprising corresponding means for receiving), and to perform deriving success information of a transmission corresponding to said radio frame from said acknowledgement compilation based on said distinction for each of said primary and said at least one secondary carrier (thus the apparatus comprising corresponding means for deriving).

For further details regarding the operability/functionality of the individual apparatuses, reference is made to the above description in connection with any one of FIGS. 1 to 4, respectively.

For the purpose of the present invention as described herein above, it should be noted that method steps likely to be implemented as software code portions and being run using a processor at a network server or network entity (as examples of devices, apparatuses and/or modules thereof, or as examples of entities including apparatuses and/or modules therefore), are software code independent and can be specified using any known or future developed programming language as long as the functionality defined by the method steps is preserved;

generally, any method step is suitable to be implemented as software or by hardware without changing the idea of the embodiments and its modification in terms of the functionality implemented;

method steps and/or devices, units or means likely to be implemented as hardware components at the above-defined apparatuses, or any module(s) thereof, (e.g., devices carrying out the functions of the apparatuses according to the embodiments as described above) are hardware independent and can be implemented using any known or future developed hardware technology or any hybrids of these, such as MOS (Metal Oxide Semiconductor), CMOS (Complementary MOS), BiMOS (Bipolar MOS), BiCMOS (Bipolar CMOS), ECL (Emitter Coupled Logic), TTL (Transistor-Transistor Logic), etc., using for example ASIC (Application Specific IC (Integrated Circuit)) components, FPGA (Field-programmable Gate Arrays) components, CPLD (Complex Programmable Logic Device) components or DSP (Digital Signal Processor) components;

devices, units or means (e.g. the above-defined network entity or network register, or any one of their respective units/means) can be implemented as individual devices, units or means, but this does not exclude that they are implemented in a distributed fashion throughout the system, as long as the functionality of the device, unit or means is preserved;

an apparatus like the user equipment and the network entity/network register may be represented by a semiconductor chip, a chipset, or a (hardware) module comprising such chip or chipset; this, however, does not exclude the possibility that a functionality of an apparatus or module, instead of being hardware implemented, be implemented as software in a (software) module such as a computer program or a computer program product comprising executable software code portions for execution/being run on a processor;

a device may be regarded as an apparatus or as an assembly of more than one apparatus, whether functionally in cooperation with each other or functionally independently of each other but in a same device housing, for example.

In general, it is to be noted that respective functional blocks or elements according to above-described aspects can be implemented by any known means, either in hardware and/or software, respectively, if it is only adapted to perform the described functions of the respective parts. The mentioned method steps can be realized in individual functional blocks or by individual devices, or one or more of the method steps can be realized in a single functional block or by a single device.

Generally, any method step is suitable to be implemented as software or by hardware without changing the idea of the present invention. Devices and means can be implemented as individual devices, but this does not exclude that they are implemented in a distributed fashion throughout the system, as long as the functionality of the device is preserved. Such and similar principles are to be considered as known to a skilled person.

Software in the sense of the present description comprises software code as such comprising code means or portions or a computer program or a computer program product for performing the respective functions, as well as software (or a computer program or a computer program product) embodied on a tangible medium such as a computer-readable (storage) medium having stored thereon a respective data structure or code means/portions or embodied in a signal or in a chip, potentially during processing thereof.

The present invention also covers any conceivable combination of method steps and operations described above, and any conceivable combination of nodes, apparatuses, modules or elements described above, as long as the above-described concepts of methodology and structural arrangement are applicable.

In view of the above, there are provided measures for ACK/NAK bit bundling in carrier aggregation scenarios. Such measures exemplarily comprise generating a set of acknowledgement bits confirming receipt of payload data of a radio frame in a carrier aggregation mode aggregating a primary and at least one secondary carrier, said radio frame being divided into a plurality of downlink subframes and uplink subframes, each of said downlink subframes comprising at least one codeword per carrier, each of said acknowledgement bits is allocated to one of said codewords of one of said downlink subframes, and applying spatial domain bundling and/or time domain bundling on said set of acknowledgement bits distinctive for each of said primary and said at least one secondary carrier, wherein said spatial domain bundling is an AND operation of all acknowledgement bits allocated to each codeword of one carrier of said primary and said at least one secondary carrier and one downlink subframe of said plurality of downlink subframes of said radio frame, and said time domain bundling is an AND operation of all acknowledgement bits associated with corresponding downlink subframes of said radio frame.

Even though the invention is described above with reference to the examples according to the accompanying drawings, it is to be understood that the invention is not restricted thereto. Rather, it is apparent to those skilled in the art that the present invention can be modified in many ways without departing from the scope of the inventive idea as disclosed herein.

LIST OF ACRONYMS AND ABBREVIATIONS

3GPP Third Generation Partnership Project
ACK/NAK acknowledgement/negative acknowledgement, A/N
CC component carrier
DL downlink
eNB evolved NodeB
HARQ hybrid automatic repeat request
LTE Long Term Evolution
PCell primary cell
PUCCH physical uplink control channel
SCell secondary cell
TDD time division duplex
UE user equipment
UL uplink

The invention claimed is:

1. A method comprising:
generating a set of acknowledgement bits confirming receipt of payload data of a radio frame in a carrier aggregation mode aggregating a primary carrier of a primary cell and at least one secondary carrier of a secondary cell, said radio frame being divided into a plurality of downlink subframes and uplink subframes, each of said downlink subframes comprising at least one codeword per carrier, each of said acknowledgement bits is allocated to one of said codewords of one of said downlink subframes; and
applying spatial domain bundling and/or time domain bundling on said set of acknowledgement bits distinctive for each of said primary and said at least one secondary carrier, including:
  performing, for said primary carrier, only said spatial domain bundling for each downlink subframe of said plurality of downlink subframes of said radio frame;
  performing, for each of said at least one secondary carrier, said spatial domain bundling for each downlink subframe of said plurality of downlink subframes of said radio frame; and
  performing, for each of said at least one secondary carrier, said time domain bundling for each spatial domain bundled acknowledgement bit associated with corresponding downlink subframes of said radio frame; wherein
said spatial domain bundling is an AND operation of all acknowledgement bits allocated to each codeword of one carrier of said primary and said at least one secondary carrier and one downlink subframe of said plurality of downlink subframes of said radio frame; and
said time domain bundling is an AND operation of all acknowledgement bits associated with corresponding downlink subframes of said radio frame.

2. The method according to claim 1, wherein
in relation to said applying, said method further comprises
performing, for each of said primary and said at least one secondary carrier, said spatial domain bundling for each downlink subframe of said plurality of downlink subframes of said radio frame;
splitting said plurality of downlink subframes into at least two groups; and
performing, for each of said primary and said at least one secondary carrier, said time domain bundling for each spatial domain bundled acknowledgement bit associated with corresponding downlink subframes for each of said at least two groups of said radio frame.

3. The method according to claim 2, wherein
in relation to said splitting, said method further comprises
selecting the first downlink subframe of every two downlink subframes of said plurality of downlink subframes of said radio frame to form a first group; and
selecting the second downlink subframe of every two downlink subframes of said plurality of downlink subframes of said radio frame to form a second group.

4. The method according to claim 1, further comprising:
sequencing each of said bundled acknowledgement bits in order of the corresponding downlink subframes of said plurality of downlink subframes of said radio frame to form an acknowledgement compilation.

5. The method according to claim 1, wherein
the method is operable at or by a terminal, user equipment, mobile station or modem, and/or
the method is operable in at least one of a LTE and a LTE-A cellular system, and/or
said radio frame comprises 10 subframes, wherein said first and second subframes are downlink subframes, said third subframe is an uplink subframe, and said fourth to tenth subframes are downlink subframes, and/or said acknowledgement bit is an ACK/NAK bit.

6. A computer program product comprising a non-transitory computer-readable storage medium bearing computer program code embodied therein for use with a computer, the computer program code comprising code for performing the method of claim 1.

7. A method comprising:
receiving an acknowledgement compilation, said compilation being a result of application, distinctive for each of a primary and at least one secondary carrier, of spatial domain bundling and/or time domain bundling on a set of acknowledgement bits confirming receipt of payload data of a radio frame in a carrier aggregation mode aggregating said primary and said at least one secondary carrier, said acknowledgement compilation being a result of application of only spatial domain bundling on the primary carrier and an application of both spatial domain bundling and time domain bundling on the at least one secondary carrier, said radio frame being divided into a plurality of downlink subframes and uplink subframes, each of said downlink subframes comprising at least one codeword per carrier, each of said acknowledgement bits being allocated to one of said codewords of one of said downlink subframes; and
deriving success information of a transmission corresponding to said radio frame from said acknowledgement compilation based on said distinction for each of said primary and said at least one secondary carrier.

8. The method according to claim 7, wherein
the method is operable at or by a base station or access node of a cellular system, and/or
the method is operable in at least one of a LTE and a LTE-A cellular system, and/or
said radio frame comprises 10 subframes, wherein said first and second subframes are downlink subframes, said third subframe is an uplink subframe, and said fourth to tenth subframes are downlink subframes, and/or
said acknowledgement bit is an ACK/NAK bit.

9. An apparatus comprising:
at least one processor; and
at least one memory including computer program code, the at least one memory and the computer program code configured, with the at least one processor, to cause the apparatus to perform at least the following:
generate a set of acknowledgement bits confirming receipt of payload data of a radio frame in a carrier aggregation mode aggregating a primary carrier of a primary cell and at least one secondary carrier of a secondary cell, said radio frame being divided into a plurality of downlink subframes and uplink subframes, each of said downlink subframes comprising at least one codeword per carrier, each of said acknowledgement bits is allocated to one of said codewords of one of said downlink subframes;
apply spatial domain bundling and/or time domain bundling on said set of acknowledgement bits distinctive for each of said primary and said at least one secondary carrier, including:
perform, for said primary carrier, only said spatial domain bundling for each downlink subframe of said plurality of downlink subframes of said radio frame;

perform, for each of said at least one secondary carrier, said spatial domain bundling for each downlink subframe of said plurality of downlink subframes of said radio frame; and
perform, for each of said at least one secondary carrier, said time domain bundling for each spatial domain bundled acknowledgement bit associated with corresponding downlink subframes of said radio frame;
wherein
said spatial domain bundling is an AND operation of all acknowledgement bits allocated to each codeword of one carrier of said primary and said at least one secondary carrier and one downlink subframe of said plurality of downlink subframes of said radio frame; and
said time domain bundling is an AND operation of all acknowledgement bits associated with corresponding downlink subframes of said radio frame.

10. The apparatus according to claim 9, and
the at least one memory and the computer program code configured, with the at least one processor, to cause the apparatus to further perform the following:
perform, for each of said primary and said at least one secondary carrier, said spatial domain bundling for each downlink subframe of said plurality of downlink subframes of said radio frame;
split said plurality of downlink subframes into at least two groups; and
perform, for each of said primary and said at least one secondary carrier, said time domain bundling for each spatial domain bundled acknowledgement bit associated with corresponding downlink subframes for each of said at least two groups of said radio frame.

11. The apparatus according to claim 10, and
the at least one memory and the computer program code configured, with the at least one processor, to cause the apparatus to further perform the following:
select the first downlink subframe of every two downlink subframes of said plurality of downlink subframes of said radio frame to form a first group; and
select the second downlink subframe of every two downlink subframes of said plurality of downlink subframes of said radio frame to form a second group.

12. The apparatus according to claim 9, and
the at least one memory and the computer program code configured, with the at least one processor, to cause the apparatus to further perform the following: sequence each of said bundled acknowledgement bits in order of the corresponding downlink subframes of said plurality of downlink subframes of said radio frame to form an acknowledgement compilation.

13. The apparatus according to claim 9, wherein
the apparatus is operable as or at a terminal, user equipment, mobile station or modem, and/or
the apparatus is operable in at least one of a LTE and a LTE-A cellular system, and/or
said radio frame comprises 10 subframes, wherein said first and second subframes are downlink subframes, said third subframe is an uplink subframe, and said fourth to tenth subframes are downlink subframes, and/or
said acknowledgement bit is an ACK/NAK bit.

14. An apparatus comprising:
at least one processor; and
at least one memory including computer program code, the at least one memory and the computer program code configured, with the at least one processor, to cause the apparatus to perform at least the following:

receive an acknowledgement compilation, said compilation being a result of application, distinctive for each of a primary and at least one secondary carrier, of spatial domain bundling and/or time domain bundling on a set of acknowledgement bits confirming receipt of payload data of a radio frame in a carrier aggregation mode aggregating said primary and said at least one secondary carrier, said acknowledgement compilation being a result of application of only spatial domain bundling on the primary carrier and an application of both spatial domain bundling and time domain bundling on the at least one secondary carrier, said radio frame being divided into a plurality of downlink subframes and uplink subframes, each of said downlink subframes comprising at least one codeword per carrier, each of said acknowledgement bits being allocated to one of said codewords of one of said downlink subframes; and derive success information of a transmission corresponding to said radio frame from said acknowledgement compilation based on said distinction for each of said primary and said at least one secondary carrier.

15. The apparatus according to claim 14, wherein the apparatus is operable as or at a base station or access node of a cellular system, and/or the apparatus is operable in at least one of a LTE and a LTE-A cellular system, and/or said radio frame comprises 10 subframes, wherein said first and second subframes are downlink subframes, said third subframe is an uplink subframe, and said fourth to tenth subframes are downlink subframes, and/or said acknowledgement bit is an ACK/NAK bit.

* * * * *